(12) United States Patent
Mattson et al.

(10) Patent No.: US 7,043,997 B2
(45) Date of Patent: May 16, 2006

(54) SEAT FOR SENSING A LOAD

(75) Inventors: Daniel J. Mattson, Pleasant Prairie, WI (US); William G. Rodseth, Antioch, IL (US); Thomas C. Herrmann, Bristol, WI (US); James E. Mraz, Linderhurst, IL (US)

(73) Assignee: Cherry Corporation, Pleasant Prairie, WI (US)

( * ) Notice: Subject to any disclaimer, the term of this patent is extended or adjusted under 35 U.S.C. 154(b) by 274 days.

(21) Appl. No.: 10/616,020

(22) Filed: Jul. 9, 2003

(65) Prior Publication Data

US 2005/0006151 A1    Jan. 13, 2005

(51) Int. Cl.
*G01L 1/24* (2006.01)
(52) U.S. Cl. ............... 73/800; 177/210 R; 177/DIG. 6; 180/273; 280/735; 250/227.14
(58) Field of Classification Search ............. 73/800; 177/144, 210 R, DIG. 6; 180/272; 280/735; 701/45; 250/227.14
See application file for complete search history.

(56) References Cited

U.S. PATENT DOCUMENTS

| | | | | |
|---|---|---|---|---|
| 4,294,513 A | * | 10/1981 | Nelson et al. ............... 385/4 |
| 4,342,907 A | * | 8/1982 | Macedo et al. ........ 250/227.14 |
| 4,369,525 A | * | 1/1983 | Breton et al. ............... 398/197 |
| 4,560,016 A | * | 12/1985 | Ibanez et al. ............ 177/210 R |
| 4,609,816 A | * | 9/1986 | Severin ................. 250/227.14 |
| 4,733,068 A | * | 3/1988 | Thiele et al. .......... 250/227.14 |
| 4,781,056 A | * | 11/1988 | Noel et al. ..................... 73/800 |
| 5,026,984 A | | 6/1991 | Gerdt ..................... 250/227.21 |
| 5,570,903 A | * | 11/1996 | Meister et al. ............... 280/735 |
| 5,633,494 A | | 5/1997 | Danisch ................. 250/227.16 |
| 5,732,375 A | | 3/1998 | Cashler ....................... 701/45 |
| 5,785,269 A | | 7/1998 | Miller, III et al. ........ 242/379.1 |
| 5,870,417 A | * | 2/1999 | Verdiell et al. ................ 372/32 |
| 5,901,978 A | | 5/1999 | Breed et al. ................. 280/735 |
| 5,917,180 A | | 6/1999 | Reimer et al. ......... 250/227.14 |
| 5,918,696 A | | 7/1999 | VanVoorhies ............... 180/273 |
| 5,957,491 A | | 9/1999 | Cech et al. .................. 280/735 |
| 5,986,221 A | | 11/1999 | Stanley ....................... 177/136 |
| 5,988,676 A | * | 11/1999 | Lotito et al. ................ 280/735 |
| 6,012,007 A | | 1/2000 | Fortune et al. ................ 701/45 |
| 6,040,532 A | * | 3/2000 | Munch ........................ 177/144 |
| 6,069,325 A | | 5/2000 | Aoki ........................... 177/136 |
| 6,089,106 A | | 7/2000 | Patel et al. ............. 73/862.582 |
| 6,109,117 A | | 8/2000 | Stanley et al. ......... 73/862.325 |
| 6,127,672 A | | 10/2000 | Danisch ................. 250/227.14 |
| 6,286,861 B1 | | 9/2001 | Cech et al. .................. 280/735 |
| 6,292,497 B1 | * | 9/2001 | Nakano ................. 372/29.015 |

(Continued)

OTHER PUBLICATIONS

U.S. Statutory Invention Registration # H322 (Simons) Aug. 4, 1987.*

*Primary Examiner*—Randy W. Gibson
(74) *Attorney, Agent, or Firm*—Brinks Hofer Gilson & Lione

(57) ABSTRACT

An automotive seat includes optical sensors for determining a load on the seat, such as a person. The sensors may be used with a computer and computer software to analyze data from the sensors in determining a weight of the load, and the sensors may also be used to determine a shape of the load. From the weight and shape of the load, the computer may decide whether the load is suitable for safe deployment of an automatic restraining device, such as an airbag.

66 Claims, 10 Drawing Sheets

U.S. PATENT DOCUMENTS

| | | |
|---|---|---|
| 6,323,444 B1 | 11/2001 | Aoki .......................... 177/144 |
| 6,325,414 B1 | 12/2001 | Breed et al. ................ 280/735 |
| 6,345,839 B1 * | 2/2002 | Kuboki et al. .............. 280/735 |
| 6,348,663 B1 * | 2/2002 | Schoos et al. .............. 177/144 |
| 6,353,394 B1 * | 3/2002 | Maeda et al. ............... 340/667 |
| 6,356,200 B1 | 3/2002 | Hamada et al. ............. 340/667 |
| 6,392,542 B1 * | 5/2002 | Stanley ....................... 340/561 |
| 6,397,136 B1 | 5/2002 | Breed et al. .................. 701/45 |
| 6,422,595 B1 | 7/2002 | Breed et al. ................ 280/735 |
| 6,452,667 B1 * | 9/2002 | Fernald et al. ............. 356/73.1 |
| 6,509,747 B1 | 1/2003 | Nagai et al. ................ 324/687 |
| 6,546,817 B1 | 4/2003 | Aoki ....................... 73/862.474 |
| 6,578,870 B1 * | 6/2003 | Winkler et al. ............. 280/735 |
| 6,662,138 B1 * | 12/2003 | Takafuji et al. ............. 702/173 |
| 6,712,387 B1 | 3/2004 | Breed et al. ................ 280/735 |
| 6,788,295 B1 * | 9/2004 | Inkster ....................... 345/175 |
| 6,845,339 B1 * | 1/2005 | Winkler et al. ............. 702/173 |
| 2001/0054682 A1 * | 12/2001 | Bennett et al. |
| 2002/0140214 A1 | 10/2002 | Breed et al. ................ 280/735 |
| 2003/0001368 A1 | 1/2003 | Breed et al. ................ 280/735 |
| 2003/0002690 A1 | 1/2003 | Breed et al. .................. 381/86 |
| 2003/0015898 A1 | 1/2003 | Breed ................... 297/216.12 |
| 2003/0036835 A1 | 2/2003 | Breed et al. .................. 701/45 |
| 2003/0116352 A1 | 6/2003 | Nakatsuka et al. ......... 174/263 |
| 2003/0121704 A1 | 7/2003 | Breed et al. ................ 177/144 |

\* cited by examiner

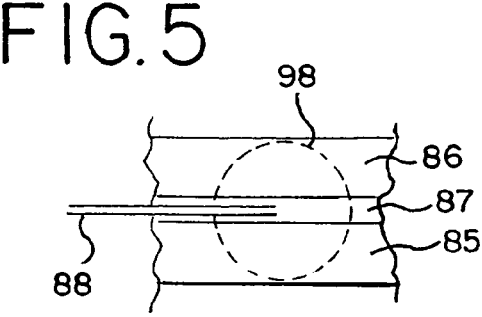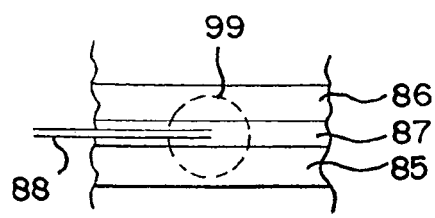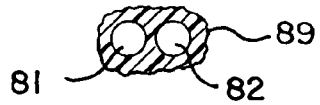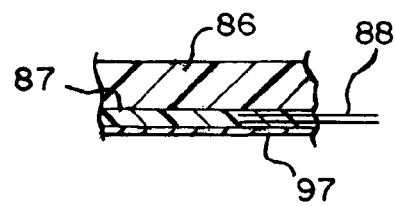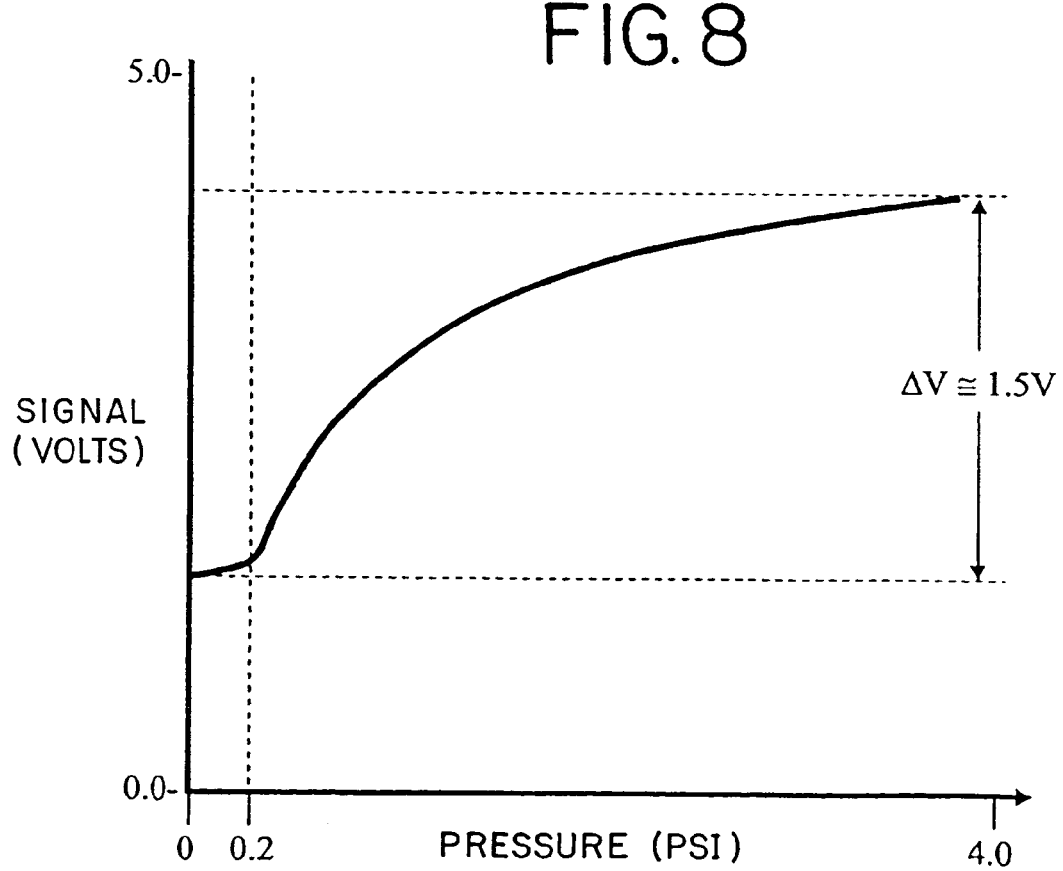

SEAT FOR SENSING A LOAD

FIELD OF THE INVENTION

The invention relates to automotive seats, and for a seat used to determine whether an occupier of the seat is of such a nature that an airbag should be deployed in an emergency situation. The seat is generally used to determine the mass and the configuration of a load occupying the seat.

BACKGROUND INFORMATION

Automobiles are equipped with air bags to prevent injuries to passengers when crashes, rollovers, and other mishaps occur. Accelerometers within an auto continuously measure acceleration or deceleration of the auto and continuously report the acceleration or deceleration to an on-board computer, such as an electronic control unit (ECU). When deceleration reaches a certain magnitude, as it does in the early moments of a crash, the on-board computer signals one or more airbags to deploy. The airbag then inflates and an instant cushion of air shields a person in the auto from some of the forces associated with the deceleration.

There are problems with airbags, however. In order to very quickly inflate to a level that will protect a person, inflation of the airbag creates a great force on the person receiving the supposed benefits of the airbag. This force is great enough to kill children or even small adults. In many cases, the force may be unnecessary, particularly if the airbag does not need to be inflated. These cases may occur if the load on the seat is a rear-facing child seat, which may adequately protect the child by itself, without the need for an airbag. In other instances, there may be no load on the seat, or the load on the seat may be inanimate or non-human, such as groceries, books, or bags. In these instances, there is no need to deploy the airbag. In other instances, it may be useful to note the weight or mass of the load, to determine whether the seat is occupied by a person requiring an airbag. It may also be useful to determine the shape of the load, and whether the load is shaped more like a box or a parcel or more like the seat portion of a human.

There are a number of problems with designing a seat with sensors for detecting a load, such as a person, on a seat. The seats of interest are primarily the front seats, concerned with airbags from the front portion of the passenger compartment that may impact the front-seat passengers. Seats in different automobiles are used for different purposes and have different sizes. It will be very difficult to have a single "standard" seat for autos or passenger cars. Auto seats come in many sizes and configurations from different manufacturers and even among different models from the same manufacturer. A driver's seat in an auto will almost always have an adult or a young adult, and thus may have a heavy load. A front passenger seat in an auto may seat an adult, a child, a child or infant seat that faces rearward or forward, or a child booster seat that faces forward (for older children). Thus, the passenger seat may have a lighter load at times. The front passenger seat may also have only an inanimate object on the seat, not requiring deployment of the airbag. Different seats from different manufacturers may have different configurations and may require different hardware and software solutions.

Attempts have been made to classify seat occupants by using the weight or mass alone. U.S. Pat. No. 6,040,532 determines the weight of a seat occupant by detecting variation in load from detectors under the seat. This method and apparatus will detect a mass, but will not indicate whether the mass is shaped like a human or a package. U.S. Pat. No. 6,353,394 uses sensors under the seat to determine the mass of an object in the seat. This method of classifying may yield a weight or mass, but again does not indicate whether the shape of the object is more like a human being or like a non-human object. U.S. Pat. Appl. Publ. 2003/0051564 A1 also uses weight sensors or load cells under the seat to determine a mass of the load on the seat. The apparatus and method in this publication also will not determine the shape of the load to help determine whether it is appropriate to deploy the airbag.

What is needed is a method and apparatus to better classify the occupant or load in a seat in order to determine whether it is appropriate to deploy an airbag. The present invention is aimed at overcoming these deficiencies in the prior art.

BRIEF SUMMARY

One aspect of the invention is a sensing system for sensing a load, comprising a sensing pad, the sensing pad further comprising an array of optical sensors. Another aspect of the invention is a sensing system for sensing a load, comprising a sensing pad further comprising a laminate structure and an array of optical sensors, wherein at least one sensor includes a strain relief. Another aspect of the invention is a sensing system for sensing a load, comprising an array of optical sensors in a sensing pad, and a liquid barrier material covering the pad.

Another aspect of the invention is a method of manufacturing a system for sensing a load. The method comprises placing a plurality of optical sensors onto an adhesive surface and assembling ends of the optical sensors into terminations. The method also comprises adhering a foam layer to the adhesive surface, and adhering a second layer over the sensors to form a sensing pad.

Another aspect of the invention is a system for sensing a load. The system comprises a sensing pad comprising two layers of silicone foam joined by an adhesive, and an array of optical sensors adhered to the adhesive. The system also comprises a first interface gathering an end of a first fiber from each sensor, and a second interface gathering an end of a second fiber from each sensor.

Another aspect of the invention is a system for sensing a load on a seat, the system comprising a seat, a sensing pad atop the seat, the sensing pad further comprising an array of optical sensors made from optical fibers, and a seat cover. The system also comprises a first interface gathering an end of one of said fibers from each sensor, and a second interface gathering an end of another of said fibers from each sensor, a microprocessor controller for sensing outputs of the sensor, and software embodied on a computer-readable medium and accessible to the microprocessor controller for computing at least one of a mass and a shape of a load on the seat.

Another aspect of the invention is a method for sensing a load on a seat, the method comprising forming a seat, the seat comprising a sensing pad having an array of optical sensors within the pad, placing a load on the seat, and operating the optical sensors and a machine vision computer program to determine at least one of a mass and a shape of the load. Another aspect of the invention is a method for classifying an occupant of a seat. The method comprises occupying the seat, operating a sensing pad with an array of optical sensors within the seat, and storing data from said optical sensors in a memory accessible to a computer. The method also includes calculating at least one of a mass and a shape of the occupant, deciding whether the occupant is a human or a non-human, and sending a signal.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE DRAWINGS

FIGS. 5 and 6 are schematic views of the embodiments of FIGS. 3 and 4;

FIG. 7a is a cross sectional view of an end of optical fibers used in the present invention;

FIG. 7b is another embodiment of a sensing pad;

FIG. 8 is a graphical view of load versus voltage output according to the present invention;

DETAILED DESCRIPTION OF THE DRAWINGS AND THE PRESENTLY PREFERRED EMBODIMENTS

Figure 1:
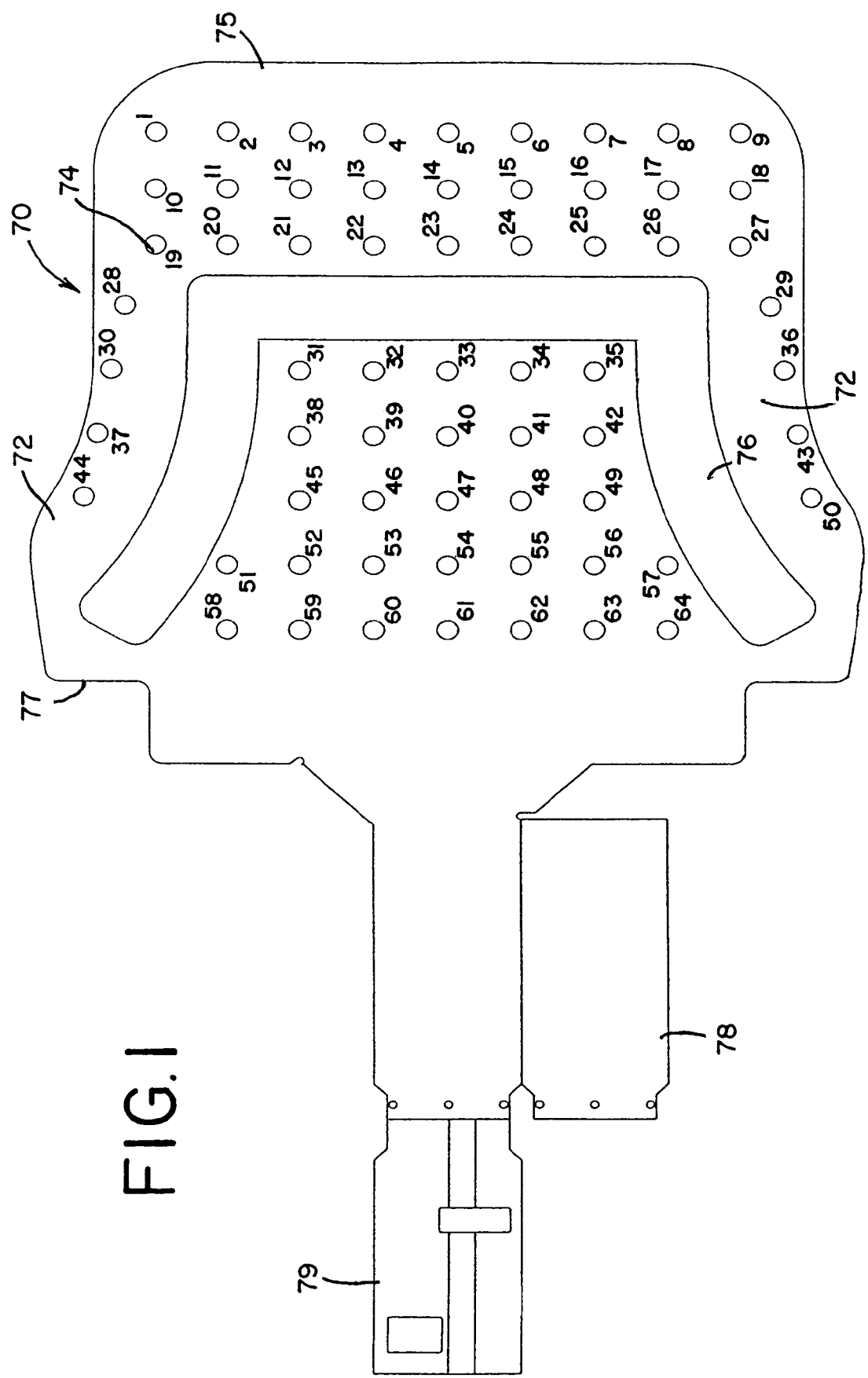
FIG. 1 is a top view of an automotive seat sensing pad according to the present invention.
Figure 2:
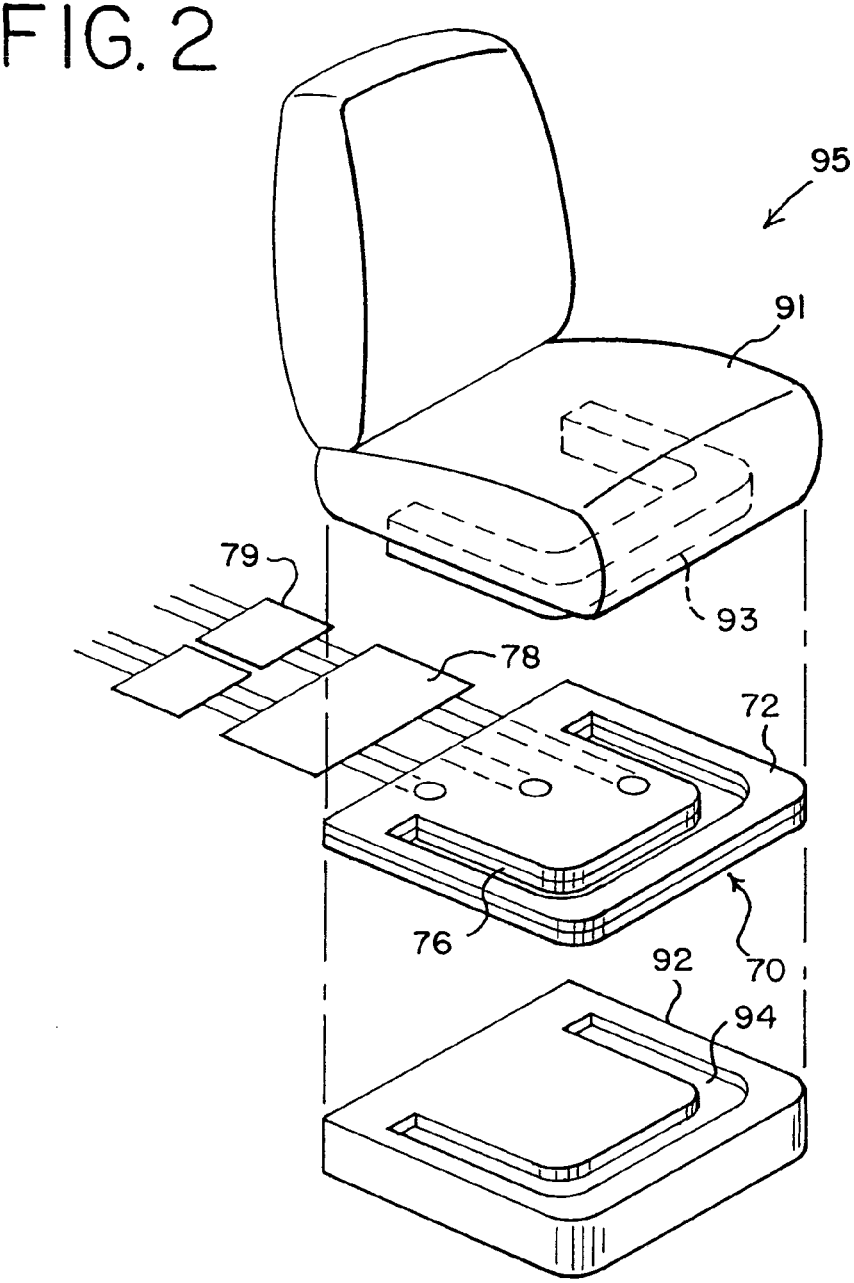
FIG. 2 is a perspective exploded view of an auto seat embodiment that includes the sensing pad of FIG. 1.

Automobile seats generally include a seat or seat bottom that is mounted to the vehicle and a trim cover or upholstery that is then mounted to the seat bottom. FIGS. 1–2 depict an embodiment of an automobile seat 95 that includes a seat 92 and a trim cover 91, as well as a sensing pad 70 that fits between the seat and the trim cover. The sensing pad includes a foam laminate 75 and a plurality of locations 74 for sensors within the pad, depicted in FIG. 1 as a series of small circles numbered 1–64. The sensors are located in the area of the pad which will be used by a seat occupant or load. Other features of the sensing pad include outer portions 72, which will correspond to raised portions or bolsters on the seat 92. The pad also includes an opening 76 that corresponds to the trench 94 in the seat 92.

The trench 94 is a void in seat 92 that is used to assemble trim cover 91 to the seat. The trench is typically from one-half inch to one and one-half inches wide, and a quarter-inch to one and one-half inches deep. There is also a corresponding portion 93 on trim cover 91 that fits through opening 76 in the sensing pad and into trench 94 of the seat. The trim cover may be retained in place by fasteners, such as hook-and-loop fasteners (e.g., Velcro® fasteners) placed in the bottom of trench 94 and the bottom of lower portion 93. The rear portion of the seat 77 marks the end of the seating area where sensors are needed. The sensing pad 70 may also include a strain relief 78 and interconnecting portion 79 for sensor input/output.

Laminate Structures

Figure 3:
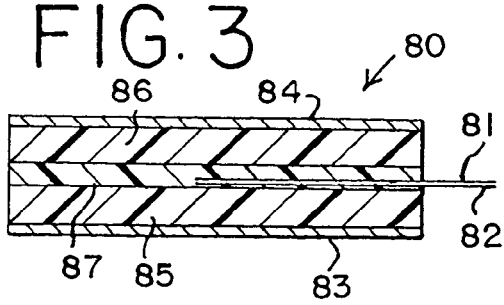
FIGS. 3 and 4 are cross sectional views of two embodiments of the invention.
Figure 4:
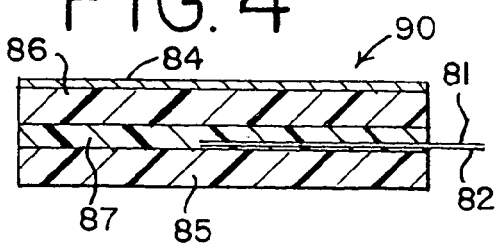

As depicted in FIGS. 3–4, the sensing pad is a laminate structure, with top and bottom layers of foam and sensors in between the foam layers. FIG. 3 depicts one embodiment of a foam laminate 80, including bottom cover 83 and top cover 84, which are preferably liquid barriers to protect the foam and the sensors. There is a bottom layer 85 and a top layer of foam 86 adhered by an adhesive layer 87. Each sensor preferably comprises, for example, a pair of optical fibers 81, 82 that are adhered by adhesive layer 87 between foam layers 85, 86, with the ends of the pair of fibers extending into an associated circular location 74.

FIG. 4 depicts another embodiment of the foam laminate 90, which is similar to foam laminate 80, except that the embodiment of FIG. 4 has only a top liquid-impermeable layer 84 and no bottom layer. The liquid impermeable layer is preferably opaque, allowing very little light transmission through the layer. A preferred material is Narcote black 800-TU, available from Narcote L.L.C., Piney Flats, Tenn. This is a black polyester material with a thin film barrier laminated on one side. It has excellent hydrostatic resistance. Other materials may also be used.

Foam laminate structures may include two layers of foam, preferably made as described above in FIGS. 3 and 4 and made by the method outlined below in FIG. 9. Other foam laminate structures may only include a single layer of foam, such as those described below in FIG. 7b. A foam laminate structure is a structure having at least two layers, at least one of which is foam.

While FIGS. 3 and 4 depict optical sensors and optical pads that use two layers of foam, other embodiments may use only a single layer of foam. FIG. 7b depicts an embodiment that uses a single layer of foam 86 and a reflective layer 97 to limit the space available for light from the sensor to scatter and reflect. The sensing pad is made from top layer of foam 86, adhesive layer 87 and the bottom layer of reflective material 97. The optical sensor 88 and reflective material 97 are adhered to the adhesive layer 87, which also adheres to foam layer 86, thus providing a laminate structure. The reflective material may be any material suitable for scattering or reflecting light or radiation and for retaining the light or radiation within the foam. Suitable materials may include any thin reflective metal, such as aluminum. Copper may be used, although it tends to tarnish more quickly than aluminum. Polymers with reflective coatings may also be used, such as metallized coatings.

The foam used may be any suitable grade of durable, reflective foam used for automobile seating. Silicone foam is preferred because of its bright, white color, broad spectral high reflectivity and its mechanical stability (long term compression resiliency and resistance to compression set). Durable silicone foam is available from Magnifoam Technology, Mississauga, Ontario, Canada. Open cell foam that has a moderate to low density (about 9 pounds per cubic foot) is preferred. The foam should have a moderate tensile strength, about 11–16 psi at 60 to 80% elongation. The compression properties of the foam are also important, the foam preferably having a compression deflection of about 0.5 to 0.8 psi (per ASTM D3675, at 25% deflection), and a compression set per ASTM D1056 of less than 1% and 5%, when run at 50% compression for 22 hours at 70° C. and 100° C. respectively. For reasons of safety, the foam should also be very resistant to fire and combustion, and a have low smoke density when subjected to flame or fire.

Figure 9:
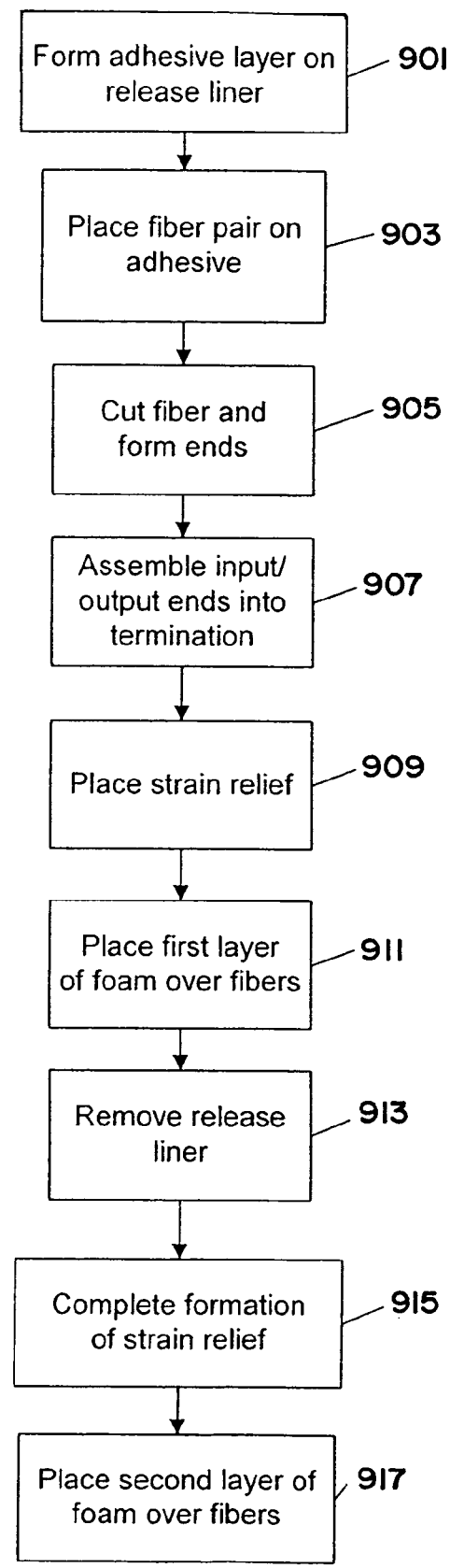
FIG. 9 is a flow chart for a method of manufacturing embodiments of the present invention.

A method of forming the sensors and the sensing pad is depicted in FIG. 9. A preferred method is to use a pressure-sensitive adhesive, such as an adhesive that is formed in a layer adhered to at least one sheet of release liner. Silicone adhesives formed on a carrier are preferred, such as NT 1001 from Dielectric Polymers, Inc., Holyoke, Mass. This adhesive has a layer of pressure-sensitive adhesive that is about 0.002 inches (about 0.05 mm) thick. The adhesive is formed 901 on a release liner, and may be masked or laser cut in the desired shape of the sensing pad, in the general outline of FIG. 1. The optical fiber pairs for a plurality of sensors are then placed 903 onto the adhesive, with the ends of each pair located within a circular location 74. The ends of the fiber pair comprising each sensor may be trimmed 905, with the fibers joined as described below. This process is repeated for as many sensors as are desired in the sensing pad.

An automatic placement machine that winds the optical fibers onto the adhesive may be used. Such machines are available from Grohmann Engineering Co., Prüm, Germany. The ends of the fiber pairs opposite the ends which terminate within the foam are then joined 907 into terminations. These terminations are connectors connecting one fiber from each sensor pair to a source of light, and the other fiber of the pair to a light sensitive detector. In operation, light is transmitted along one fiber of each pair to an associated sensing area 74 on the seat. Depending on the degree of compression at each sensing area, light is transmitted or coupled to the other fiber of the pair and is carried to the associated light detector. The amount of light corresponds to the degree of compression for the sensor pair at the associated area 74. The light received at the detector from each pair is then converted to an electrical signal. An optical linear array sensor works well for detecting light individually from a number of optical fibers.

A strain relief is then placed 909 on one side of the fibers and near the terminations. A first layer of foam is then placed 911 over the fibers and adhered to the adhesive forming a sensing pad. The pad is then turned over, with the adhesive release liner on top, and the release liner is removed 913. Alternatively, the first layer of foam may be first placed onto the adhesive before the fibers are placed. The formation of a strain relief is then completed 915. The strain relief may be a flexible piece of plastic or elastomer, preferably strongly adhered to each of the optical fibers that passes through the strain relief. A second, matching piece of strain relief and foam is then placed 917 onto the other side of the adhesive, completing the formation of the sensing pad. As noted above, the sensing pad may also include a liquid barrier material to protect the foam and the sensors from liquid intrusion.

The strain relief is preferably opaque and may be electrically conductive, to protect the optical fibers from external light and to prevent accumulation of static electricity in the areas of the strain relief and the fibers. The material may be any suitable material, such as polyester or styrenic compounds, which may be treated so as to bleed off static electricity and not to interfere with the optical fibers and the electronics. One suitable material is black neoprene elastomer, ASTM-D 2000 specification 86E, type BC. A thickness of 1/32" of material is sufficient. It is available from McMaster Carr Co., PN 9455K41. The strain relief is preferably adhered to the optical fibers with an adhesive, fixing the fibers in place while protecting them from light and from mechanical stress and strain. Any adhesive suitable for neoprene, flexible and chemically compatible with the other components, will work. The entire length of each optical fiber is protected from light, and it is preferable to protect the components from static electricity.

Sensor Formation and Performance

The sensors used in embodiments of the present invention are preferably optical fibers, arranged in sensor pairs. Light is transmitted from a light source at one end of a first fiber to the other end of the fiber. Light exits this end of the first fiber and is scattered by a compressible scattering medium, such as foam. The light is then coupled to a second fiber adjacent to the first fiber where the light exits the first fiber. The light that enters the second fiber then travels to the far end of the second fiber and is detected by a light detector. The amount of light detected is a function of the scattering characteristics of the foam and the other optical components of the system. The more the foam is compressed by the load on the seat, the more light from the first fiber is scattered back into the second fiber. While visible light is preferred, the terms optical and light also include other portions of the electromagnetic spectrum, including ultraviolet and infrared wavelengths. Any electromagnetic radiation that is capable of transmission through optical fibers or waveguides and capable of being scattered by a compressible scattering medium is meant to be included.

FIG. 7a depicts the sensors preferably used in the foam laminate. Two fibers may simply be placed side by side to form a sensor. Preferably, two optical fibers 81, 82 are joined to form a sensor. While glass fibers may be used, the optical fibers are preferably plastic, and they may be joined or coupled optically through the foam by several means, such as by melting the fibers together. The melted plastic 89 formed around and between the fibers couples the fibers mechanically (but not optically) for use as a sensor. The extra material adds about 25–75% to the cross-sectional area of the fibers joined on the end. Preferred optical fibers include Mitsubishi SK10 and EK10, which are polymethylmethacrylate (PMMA) fibers about 0.010 inches in diameter (0.25 mm). The fibers are multimode optical fibers. It is important that the fibers be resistant to both heat and humidity, as in most automotive applications, because autos and their seats may be exposed to both extremely high and extremely low temperatures, and to high levels of humidity at high heat.

While optical fibers are preferred, other light or radiation conductors may also be used. Thus, if the radiation used is microwave radiation or radiation of a millimeter-length wavelength, small, hollow, highly reflective waveguides may be used instead. The sensors may comprise pairs of mechanically coupled waveguides and the sensing pads may comprise an array of these sensors. The term "waveguide" means a material medium that confines and guides a propagating electromagnetic wave. "Material" means that the medium is something other than air or vacuum, i.e., a material, such as a hollow, aluminum tube having a round or square cross section.

The sensors may be formed and joined by any of several means. The fibers may be cut to length mechanically and melted together to form a sensor. The sensor may then be assembled as desired, preferably using one end from each of two fibers, and the sensors are placed in the foam laminate to be used in the automotive seat. The fibers may be cut and joined side-by-side. The fibers may be cut by techniques of laser cutting and water-jet cutting. The fibers may be joined or coupled to one another by laser heating, conductive heating, or radiative heating. In a preferred method, the fibers are coupled and trimmed simultaneously by laser cutting. The ends of the fibers are preferably cut sharply, at a 90° angle to the length of the fiber.

The operation of the sensors is depicted in FIGS. 5–6. FIG. 5 depicts the optical sensor 88 made of two mechanically coupled optical fibers in a foam laminate made of a first foam layer 85, a second foam layer 86, and an adhesive layer 87 joining the foam layers and the sensor. In FIG. 5, the first fiber transmits light and scatters the light into the foam and adhesive laminate. The light may be scattered, refracted and reflected by the foam and adhesive. The second fiber catches light in a zone 98 that surrounds the fibers. Light that is directed into the second fiber is transmitted by the second fiber back to a detection circuit. Sensors are preferably separated from one another by about two inches (about 5 cm) so as to cover the majority of the seat. The sensors may be spaced further apart to cover a greater area, or the sensors may be spaced closer (as close as about 5 mm) for greater sensor density and coverage of a smaller area.

In FIG. 5, the seat of which the foam layer forms a part is unoccupied by a person or a load. Therefore, the foam layers are uncompressed and may be at their full height, from about 1/8" to about 1/4" high (about 3 mm to about 6 mm). Other thicknesses may be used. Because the foam is uncompressed, the density of the foam in the vicinity of the sensor is low. The light emitted from the first fiber is scattered throughout approximately spherical zone 98. Zone 98 is not necessarily a hole or void cut into the foam or the adhesive. If desired, a hole or void may be placed in either or both layers of foam, or in the adhesive. Zone 98 may simply be the distance light is able to travel in the uncompressed foam layers 85, 86 and adhesive layer 87.

FIG. 6 depicts the layers of foam 85, 86 and the zone 99 when the seat is occupied by a person or a load. The layers of foam are compressed to a higher density. The light or radiation is able to travel less far into the foam, and the foam reflects or scatters more of the light from the first fiber back into the second fiber. Therefore, when the foam around a sensor is compressed, more light is reflected and scattered into the second fiber. The ends of the second fibers from a plurality of sensors are connected to a linear array sensor which converts the light from the fibers into electrical signals. The greater the weight or mass that sits on the seat and the sensing pad, the more the pad and the foam is compressed, and the more light is reflected and scattered from the first fiber into the second fiber of each sensor. Using an array of these optical fibers, a mass or weight of a load may be sensed and a shape of the load may be calculated or determined. Note that in sensing pads using only a single layer of foam and a reflective layer, such as the embodiment depicted in FIG. 7b, light will be emitted in a roughly hemispherical zone rather than the spherical zone depicted in FIGS. 5 and 6.

Performance of the sensors is depicted in the graph of FIG. 8. As the load and pressure on the seat and the sensing pad increases, more and more light is reflected or scattered back into the second fibers, and hence more light is detected by a light detector, as will be explained below. As more light is detected, a sensing circuit that includes the optical linear array sensor generates a higher voltage, proportional to the compression of the foam and the quantity of light detected. Tables of voltage output versus weight may be generated and adapted for a variety of parameters, including light intensity, calibration data, such as gain and offset values, or other desired parameters. Special consideration may be given to sensor readings at very low levels of light, or very light loads, and very heavy loads, toward the upper end of the capability of the sensor. These tables may be entered into a memory accessible to a microprocessor controller or digital signal processor of a system employing the sensor array. From these tables and the sensor readings, a weight or mass of a load on the seat may be calculated.

Sensing Pad Layout and Systems

Figure 10:
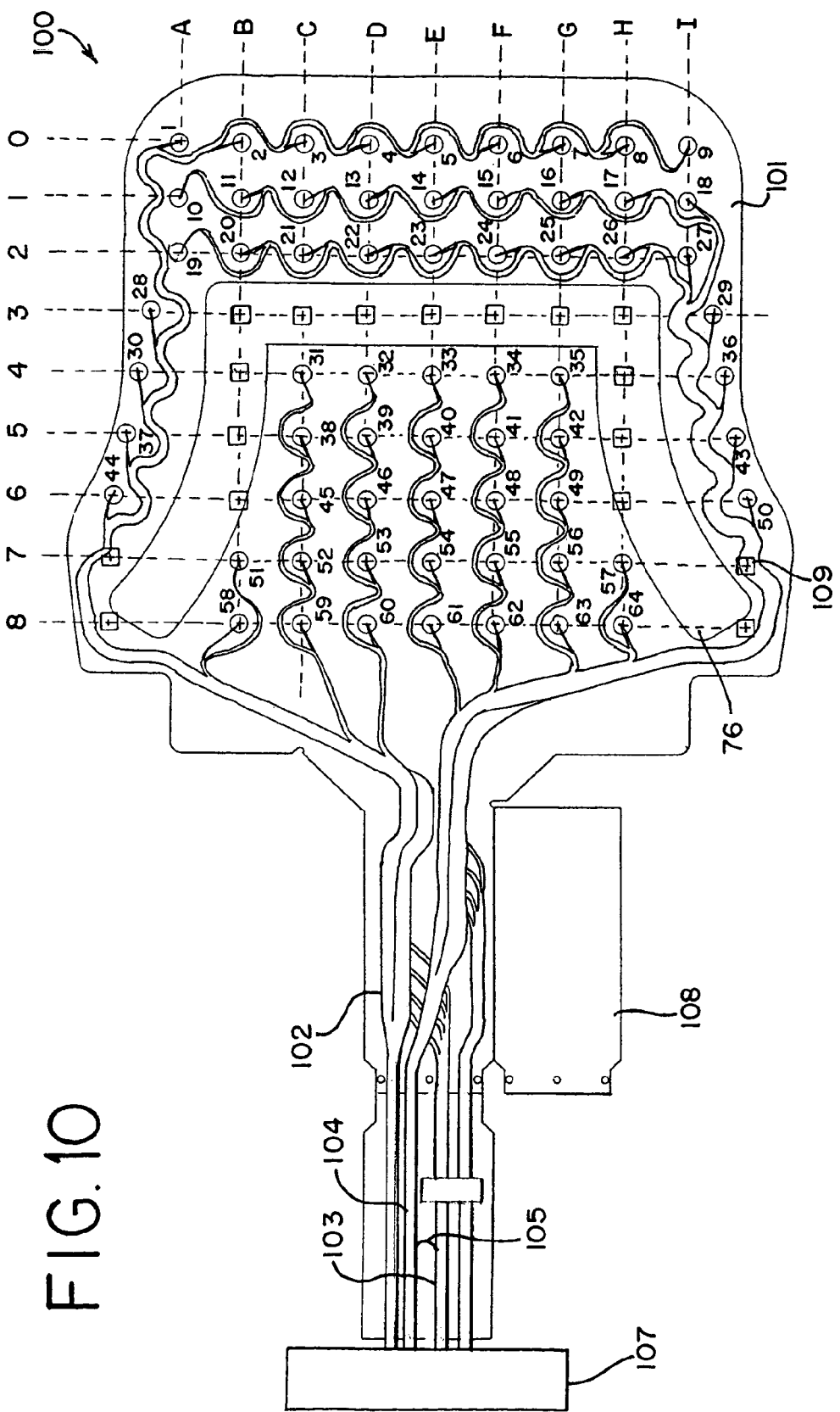
FIG. 10 is a top view of another embodiment of the present invention.

FIG. 10 depicts a partial view of another embodiment of a sensing pad. The sensing pad 100 includes a foam bottom layer 101, a void 76 in the foam for the trench, and a sensor array 102. The view depicted in FIG. 10 thus has the top layer of foam stripped away so that the locations of the sensors may be seen. The sensors themselves are very small, that is, the sensors are essentially the very tips of the optical fiber pairs. Therefore, the sensors are located at the end of each pair of fibers. As each optical fiber pair goes to its appointed location in the pad, the bundles of fibers 103, 104 gradually become less and less thick and finally conclude in optical fiber pairs. Each fiber pair approaches its sensing location via a serpentine path. These curves provide strain relief for the sensor, preventing strain on the fibers comprising the sensor. In service, localized heavy loads may be placed on the seat. Using the design depicted, with a curved, gradual approach to the desired location, each fiber pair and sensor is less likely to experience a "straight-line" strain that could possibly damage the fibers or sensor.

The target locations for the sensors are then the small circles labeled 1–64 in FIG. 10. These circles are not necessarily holes in the foam or in the adhesive, but are merely locations for the sensors, which may be determined by the intersections of the grid formed by vertical dashed lines labeled having outer numerals 0–8 and horizontal dashed lines labeled by letters A–I, on the outside of the pad. The locations for the sensors coincide roughly with the intersecting dashed lines, including a first array of 27 sensors (1–27) in the front portion of the seat (the right side of FIG. 10), and a further 25 sensors in a 5 row, 5 column second array on the left side of void 76, 4 more sensors (at locations 51, 58, 57 and 64) outside the second array, and 8 more sensors in two groups near the outer and back edge of the pad (locations 28, 30, 37 and 44, and locations 29, 36, 43 and 50). These latter eight locations, in the outer, rear portions of the seat, are placed near the bolster portion of the automotive seat. The bolster portion is the raised portion of an automotive seat that may be on both sides of the seat, for extra support and comfort, as opposed to the central portion of the seat. The front portion of the seat may also be raised, that is, with more cushion and support for an occupant of the seat.

The sensor array 102 includes the sensors themselves and the bundles of fibers necessary to connect the sensors to a source of light that is sent to the sensors and to a detector array that receives light from the sensors. In this embodiment, the array includes two bundles of fibers 103 that transmit light to the sensors. There are also two bundles of fibers 104 that transmit the light that has been received by the sensors. The bundles and the individual fibers are terminated in a connector 107. There is also a strain relief 108.

More irregular seat topology may be more easily covered with imaginary or virtual sensors at locations that pose installation or functional problems for real sensors. Locations for the imaginary sensors are designated as squares 109 in FIG. 10. The imaginary sensors may be located in the void portion of the trench 76, as well as in other areas toward the left portion of the sensing pad, which corresponds to the rear of the seat. In other seats, other locations may be used for imaginary sensors.

It is understood that these are not the only areas or locations where imaginary sensors may be located. Imaginary sensors, however, may be most useful where real sensors are located only with difficulty. For instance, it should be clear that it would be very difficult to locate an actual sensor in the trench area of the seat or sensory pad. It would be difficult because the sensing pad has a void in these areas. Sensors would therefore have to be located at the bottom of the trench, by hand, when a seat is assembled on a vehicle. This would be very costly, and the sensor's location would be subject to a good deal of variation from seat to seat. On the other hand, the trench area is a considerable portion of the seat, and it is desirable to cover this area with sensors. Using imaginary sensors solves the problem of how to locate sensors in a void. The use of imaginary or "virtual" sensors produces better results, i.e., contiguous contact imprints in seats with obstructions. This allows the use of more conventional software programs that employ the sensor data for determining the nature of the load on the seat.

Figure 11:
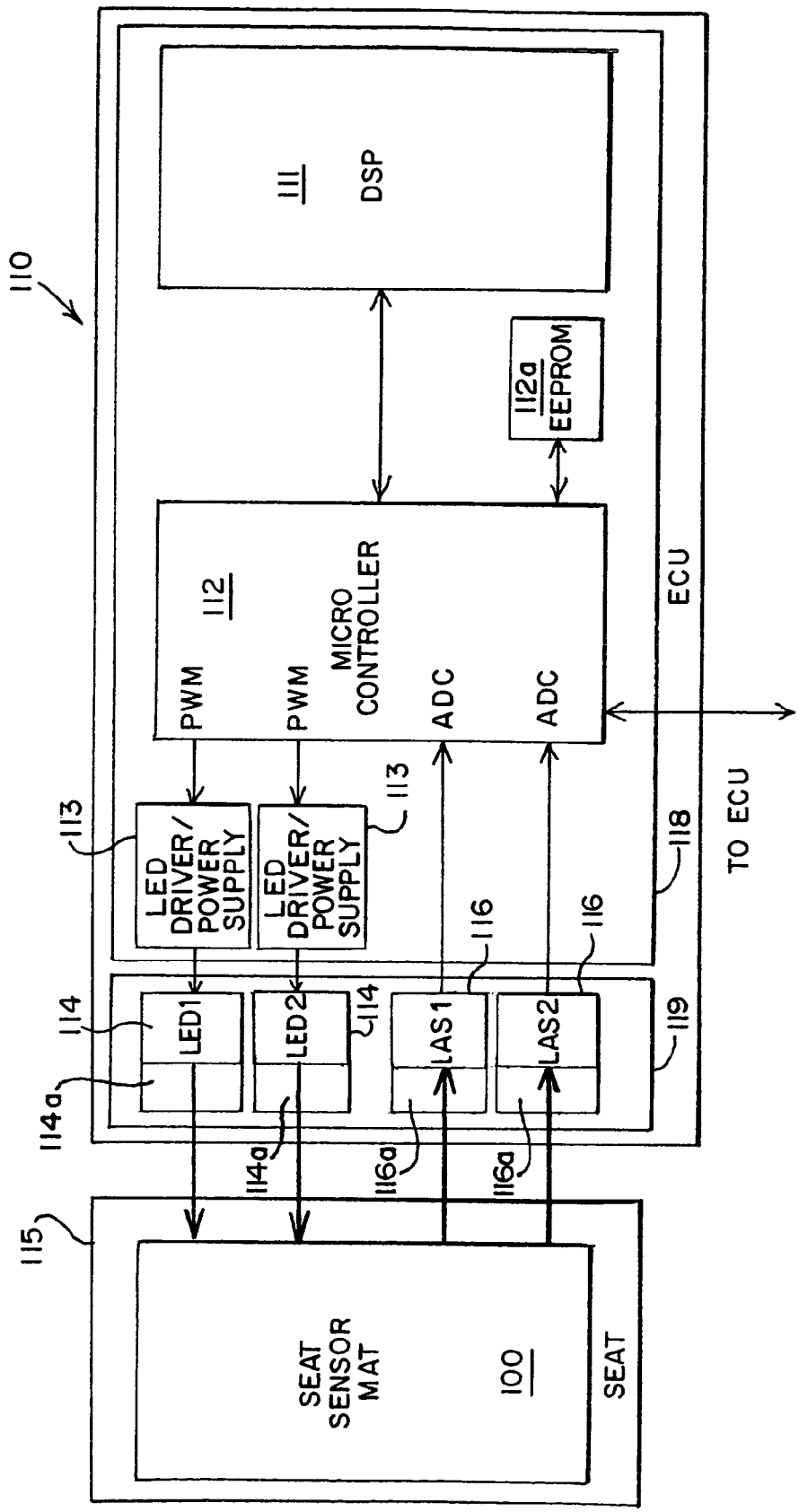
FIG. 11 is a block diagram of a systematic embodiment of the present invention.

A system 110 including an automobile seat with a sensing pad is depicted in FIG. 11. An auto seat 115 includes a sensor mat or pad 100 as described above. The optical fibers are connected to the sensing pad through connector 107, as shown in FIG. 10, the connector interfacing to a small circuit board 119, such as a daughter board. Daughter board 119 may then interface with a mother board 118 with the system controller and other components. Connector 107 connects the input optical fibers with one or more light sources or LEDs 114, LED1, LED2, and optical interfaces 114a (LED to optical fibers), to generate light and transmit the light to the optical sensors.

Light that is reflected or scattered is then received through the output fibers. The output fibers are connected to optical interfaces 116a (optical fibers to linear array sensors) and one or more light detectors or linear array sensors 116, LAS1, LAS2. The interfaces of the LED to the optical fibers may be any interface suitable for the desired number of optical fibers. Such connectors are available from Cherry Corp., Waukegan Ill. Optical sensors may be any sensors suitable for converting optical signals to electrical signals, and are available from Texas Advanced Optoelectronic Solutions, Plano, Tex. One suitable model is TSL1401R, a CMOS 1×128 linear array sensor. In a preferred embodiment, adhesive may be used to maintain the position of optical connectors 116a adjacent linear array sensors 116. A preferred adhesive is one that is quickly cured with UV light, such as a UV-curing acrylated urethane adhesive. Numbers 3105 and 3108 from Loctite Corp. are preferred.

In the arrays depicted in FIGS. 1 and 10, 64 sensors are used, requiring 64 optical fiber pairs, 64 optical fibers to supply light to the sensors and 64 optical fibers to transmit the light back to the optical detectors. It may be convenient to bundle these fibers into two bundles of 32 fibers each, to fit into connectors for the light sources or LEDs, and into connectors for the linear array sensors. As mentioned above, these connectors are available from Cherry Corp., Waukegan, Ill. The linear array sensors receive a light input and convert the light input into an electrical output.

As further shown in FIG. 11, the LEDs 114 are desirably driven by one or more constant current power supplies/LED drivers 113, preferably under pulse width modulation (PWM) control from a microprocessor controller 112. The signals from the linear array sensors are electrical voltages sent to a microprocessor controller 112 that controls the seat for sensing a load. In one embodiment, the linear array sensors output an analog voltage that is converted into digital signals by analog-to-digital converters (ADCs) connected to or part of the microprocessor controller. System 110 may also include one or more memory components, such as EEPROM 112a for storing calibration information or other information, such as information useful for look-up tables for the microprocessor or other components in the system. The system may also include a digital signal processor 111 for conversion of the optical fiber readings into signals or outputs that are ultimately passed to an electronic control unit (ECU) for the automobile of which the seat and sensing pad are a part. The digital signal processor may also include software or computer programs for converting the optical signals into an estimated weight or mass loading on the seat. The programs may also include routines for converting the signals into an estimate of the nature of the load on the seat from the shape of the load.

The hardware for system 110 may be any suitable hardware for electro-optical applications. A microprocessor controller may be any microprocessor with at least 4K of RAM and 128K of flash memory. Microprocessor controllers may include Atmel's model AVR ATmega 128 and model MC68HC908 from Motorola. Model ST92F120 from ST Electronics works well. A digital signal processor with 32K of memory and reasonable speed is required. Useful models include Motorola DSP56311 and Analog Devices model ADSP2188N. Texas Instruments model TMS320VC5409 is also suitable.

Seat Occupant Classification Systems

As mentioned above, the optical sensors detect more than merely the presence of an object or weight on the foam pad and the seat. The nature of the optical sensors used is that more light or radiation is transmitted if the load is greater, and less light is transmitted if the load is lighter. The resulting optical, electrical, and digital signals therefore indicate both the presence and the quantity of the load on the foam pad and the seat.

Programs that are useful for interpreting those signals include machine vision image analysis programs, including programs for object segmentation and recognition. Once the signals are converted into digital signals, the signals may be processed by a host of techniques that are well known. These include adjustment of images formed in the pattern of the sensor array, filtering and smoothing, manipulation of data by arithmetic techniques, use of thresholds for determining optimal imaging, blob analysis, and feature shape and moment analysis. These analyses may include analysis for a perimeter of the object or load on the seat, analysis for a centroid of the load, and analyses for moments of the load. Machine vision programs useful for detecting a load and measuring the shape of the load are available from Matrox, Inc., Dorval, Quebec, Canada. Preferred programs include the Matrox Imaging Library (MIL). These programs may be described as a "tool box" of analytical tools suitable for analyzing an array of sensory inputs, such as pixels or taxels, to determine the shape of an object. Other commercially available programs may also be used. Analytical tools from Matrox may be used with data from the sensors and a classification scheme to estimate the nature of the load.

In one embodiment, such a program is used in a "static" manner to periodically update whether an airbag is enabled or disabled, depending on the nature and mass of the load on the seat. The update need not be especially rapid, but should be reasonably frequent, such as about 0.1 Hz to about 10 Hz, or an update about once per ten seconds to about ten times per second, with calculation cycle times of about 10 sec and 100 ms, respectively. In one embodiment, the update may take place about every 5 seconds. Other embodiments may use such a program in an "active" manner, such as when the program is updated once a crash has begun. These embodiments would require a much faster response, such as at least 100 Hz.

Object recognition techniques may include parametric and non-parametric techniques. These techniques may include linear classifiers, quadratic classifiers, nearest neighbor techniques, neural networks, fuzzy logic techniques, decision trees, clustering, and so forth. All these techniques may be used to interpret the optical signals and to train the system to identify a human being as differentiated from an object or an inanimate load on the seat.

For example, a nearest-neighbor technique or algorithm may be used to determine the load in a particular area by looking at the loads of the "neighboring" sensors. One of the values of the "virtual" sensors used in the present invention is that the area covered is close to several actual sensors. The "nearest-neighbor" technique may thus be valuable in completing the "picture" or image of a load in areas where it is impractical to place an actual sensor, such as in the trench area or high on the bolster. Thus, in FIG. 10, the values for the virtual sensors (square locations) may be determined by the values of the actual sensors (small circles) nearest the virtual locations. For instance, the value of the virtual sensor (square) nearest the top of vertical dashed line 3 may be determined with reference to actual sensors (circles) at locations 19, 20, 21, 28, 30 and 31.

In one embodiment, there is more than one actual sensor near each virtual sensor, and the actual sensors are weighted equally in determining the load for the virtual sensor. In other embodiments, the nearby sensors are weighted from about 40/60 to about 60/40, depending on the distance from the desired location of the virtual sensor whose value is being determined. In other embodiments, virtual sensors may be located further away from actual sensors, such as virtual sensors in the extreme rear of the seat, on either the left or right sides of the seat. Examples in FIG. 10 include the squares 109 shown at the top and bottom of vertical dashed lines 7 and 8 in the sensor array.

The weightings and values for these virtual sensors may be different from virtual sensors located in the trench area 76. Weightings for these outlying virtual sensors may be determined by using nearest-neighbor techniques for the virtual sensor closest to actual sensors. Thus, in FIG. 10, the values for the virtual sensor on the top of vertical dashed line 7 may be determined using a nearest-neighbor technique, with the nearest neighbors being actual sensors at locations 44 and 51. After completion of a value for this sensor, a value for the virtual sensor on the top of vertical dashed line 8 may be determined using the actual sensor at location 58 and the value for the virtual sensor at the top of dashed line 7. Similar methods and calculations may be performed for the virtual sensors "located" at the bottom of vertical dashed lines 7 and 8, with the value for the virtual sensor at the bottom of dashed line 7 being determined first, and then used as a nearest neighbor, along with the actual sensor at location 64, to determine the value of the virtual sensor "located" at the bottom of vertical dashed line 8. Techniques other than "nearest-neighbor" may also be used.

Neural network-type algorithms may also be very helpful in determining the classification of an area or a sensor whose reading may be doubtful. The question is frequently whether the area or sensor reading is correct or incorrect, and whether the load detected should be lower or higher to match the readings of other sensors near the doubtful reading. For example, a person sitting on a seat would be expected to yield relatively consistent readings from sensor to sensor over a broad area. A person kneeling backwards on a seat, however, might yield sensor readings that are very high in two areas (his or her knees), and relatively low in the remainder of the areas or sensors.

Optical Sensor Controls and Interfaces

Figure 12:
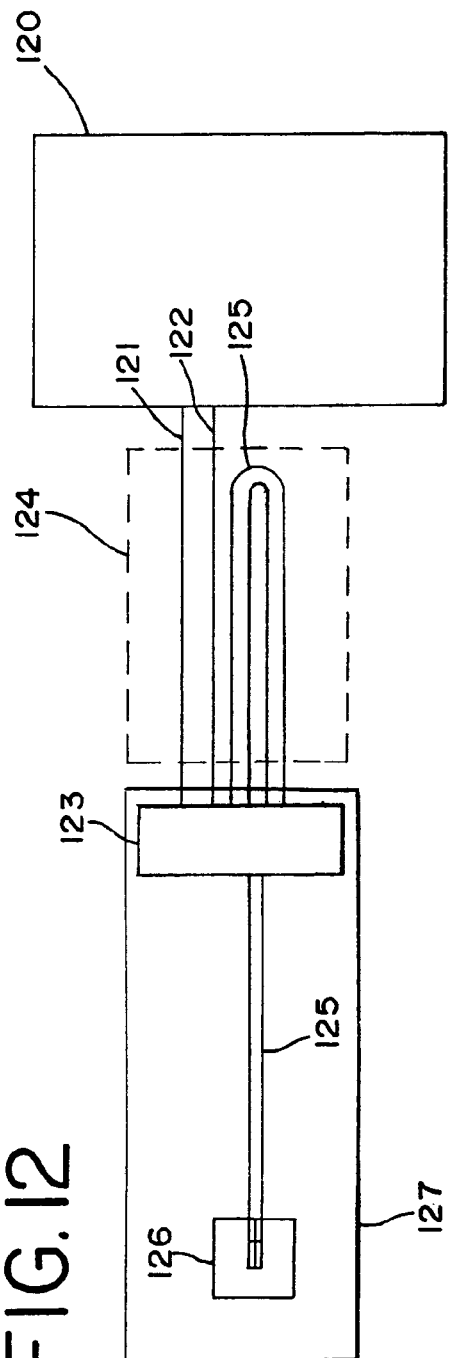
FIG. 12 is a schematic diagram of another embodiment of the present invention.
Figure 13:
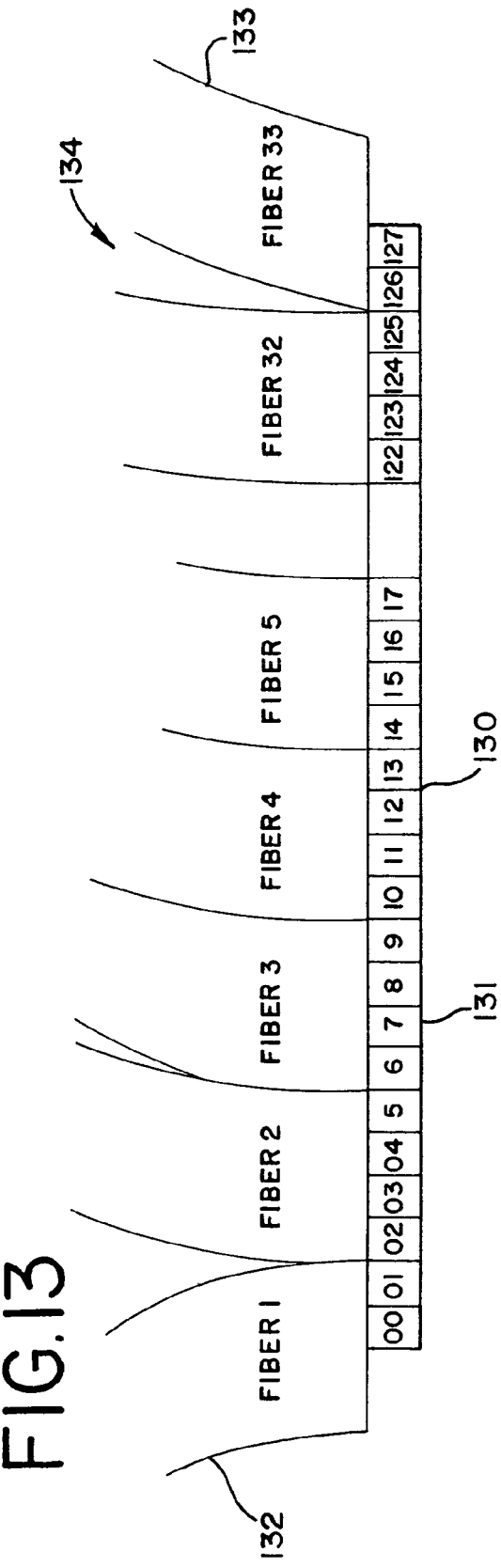
FIG. 13 is a schematic version of one technique for interfacing the optical fibers used in the present invention with a linear sensor array.

A closer view of the optical fiber systems useful for detecting and classifying objects on a seat is presented in FIGS. 12–13. FIG. 12 depicts a sensing pad 120 with optical fibers 121, 122 transmitting and receiving light. Fiber bundles 121 transmit light from light sources such as LEDs (not shown) and fiber bundles 122 transmit light which was received from optical sensors to linear array sensors (not shown). The LEDs and linear array sensors may be housed in an opaque housing 127 so that ambient light does not interfere with the optical signals. In addition to the optical fibers described above, it may be useful to have control circuits that monitor the performance of the light source or sources, the optical fiber, the foam and the light detectors or linear array sensors used in the system.

In FIG. 12 there is an additional pair of optical fibers 125 used as a control. The pair consists of a single optical fiber connected to the light source and a single optical fiber connected to the light detector, such as a fiber from bundle 121 from the light source and a fiber from bundle 122 to the light detector. These fibers are connected at the interconnector 123 and then paired off and embedded in the strain relief 124. The fibers thus travel at least part of the distance as all other optical fibers from bundles 121, 122. Fiber pair 125 then exits strain relief 124 and is routed back into housing 127. The pair may be routed as shown or may rejoin bundles 121, 122 before separating while in housing 127.

Inside housing 127, there is a very small foam laminate 126 which may be identical in composition to the foam laminate or sensing pad used in the automotive seat sensing pad 120. Optical fiber pair 125 is terminated within laminate 126 in the same manner depicted in FIGS. 5–7, achieving an optical sensor or optical coupling. Using this arrangement, fiber pair 125 acts as a control, at least for adjusting the level of light to compensate for the system temperature. The control may also adjust for aging and other factors that vary the relationship between input to the light source and output from the light detectors.

The microprocessor can adjust the output of the light source current supply/LED driver 113 to adjust for a constant output from the light detector 116 as interpreted by microprocessor controller 112. As depicted in FIG. 11, there may be more than one light source and more than one light detector. It is desirable to provide a control pair 125 for each light source and light detector by running more pairs in parallel with control pair 125. Foam laminate 126 may be made sufficiently large in size to accommodate more than one optical sensor without coupling or light interference between adjacent sensors. Other control methods or devices may be used, in place of the optical sensor control just described. For instance, a thermocouple or resistance-type temperature measuring device may be placed in the sensing pad 120 or in strain relief 124. A temperature compensation routine in system 110 or microprocessor controller 112 may then adjust the current to the LED drivers or power supplies to compensate for the expected performance change caused by temperature variation.

EEPROM 112*a* may be used to store information that is used by the microprocessor or the DSP, but which may change and which can be re-programmed more easily than the microprocessor or the DSP. The EEPROM may be used to store calibration information for the sensors, such as the gain and offset for each sensor, as described above in the section on sensor performance. The EEPROM may also be used to store calibration values for the light detection circuits, such as the linear array sensors described above. It may also store error codes or diagnostic trouble codes as part of a built-in-test system that is part of the system for sensing a load on a seat. Such programs will store an error code for faults detected during run time for later interrogation and output. The EEPROM may also be used for storing calibration values useful for machine vision programs described above, and also for programs useful for calculating a weight or a mass from the sensor readings, and for classifying an object or a load on the seat.

FIG. 13 depicts a manner of interfacing optical fibers 134 with a light detector or linear array sensor 130. In one embodiment, each light detector 130 may be able to accommodate 33 each 0.25 mm optical fibers. The light detector has four light sensitive areas, or pixels, under each optical fiber. In order to accommodate the maximum number of optical fibers from the sensors, and an optical fiber from a control sensor as described above, two of the fibers are positioned over only two pixels, those optical fibers being located on the ends of the linear sensor array. Thus, the first fiber 132 may be the control fiber and may use only two pixels of the 128 available from the linear array sensor. The last optical fiber 133 may also use only two pixels, and thus will be monitored somewhat less accurately than the four-pixel configuration of each of the other 31 fibers 134, fibers 2 through 32 in FIG. 13. Monitoring the optical fibers with more than one pixel allows for greater measurement accuracy of the sensor signal by the electronic hardware and computer programs that interpret the signal, such as the machine vision or image analysis programs discussed above. Because the fibers are multimode, and the visual signal does not travel uniformly though the cross section of the optical fiber or waveguide, the use of multiple pixels may yield a better result than merely using a single pixel for each sensor.

It is clear from FIG. 13 that the fibers 134 are close to one another when bundled to the linear array sensor 130. Light received from fiber 2 will be primarily incident on pixels 02, 03, 04 and 5, while light from fiber 3 will be primarily incident on pixels 6, 7, 8 and 9. Interference or cross-talk between adjacent fibers and corresponding pixels that monitor them is undesirable. Therefore, it is preferable to only use non-adjacent fibers at any moment, such as fiber 1, fiber 3, fiber 5 and so on, at one moment, and fiber 2, fiber 4, fiber 6 and so on, at another moment.

One way to accomplish this is to employ more than one light source or otherwise control which sensors, and thus which "receive" fibers, are active at a given moment. For instance, all the fibers from the first LED or light source may be designated "A" fibers or odd fibers, and all the fibers from the second LED or light source may be designated "B" fibers or even fibers. The fibers that join with the "A" or "B" fibers to form a sensor are also designated as "A" or "B", respectively. "A" and "B" or "odd" and "even" designations are chosen such that the fibers routed to the light detectors or linear array sensors will be half "A" and half "B" fibers, and they will be chosen such that no "A's" are adjacent one another and no "B's" are adjacent one another on the LAS.

As shown in FIG. 13, the fibers may also be "even" or "odd" numbered, and will also alternate in position. Thus, there will be two bundles of fibers from the light sources and two bundles of fibers to the linear array sensors, as depicted in FIGS. 10–11. The routing of the fibers within each LAS would alternate odd and even fibers receiving a signal, as shown in FIG. 13. If the fibers are designated as "A" or "B" fibers, the fibers may be arranged as ABABABAB, and so on, for LAS1 and BABABABA, and so on, for LAS2.

When the sensors are used, the light sources are pulsed alternately at a desired frequency, such as about 10 Hz. When the first light source is pulsed, light will be transmitted only to the odd-numbered or "A" transmit fibers, and to the sensors with which the odd-numbered or "A" transmit fibers interface. The receive fibers joined to the pulsed-on fibers will then receive the reflected and scattered light, and will transmit the light only to every other fiber (odd numbered fibers or "A" fibers) on the linear array sensor. There will thus be a break of four light-sensitive areas in the linear array sensors, eliminating cross-talk between fibers. Accuracy may also be enhanced by monitoring an additional pixel on either side of each active fiber to measure light that may not be coming out of the fiber in a straight fashion, i.e., parallel to the axis of the fiber. Therefore six pixels may be used to measure each fiber, and thus each sensor. The second pixel in each "A" fiber measurement will be the "sixth" pixel for the "B" fiber adjacent on its left, and the fifth pixel in each "A" measurement set will be the "first" pixel for the "B" fiber adjacent on its right when the LED for the "B" fibers is pulsed. The pattern is necessarily truncated to include just the inner side at the ends of the linear array sensor. Other fiber to pixel ratios also work.

Classifying a Load on an Automobile Seat

Figure 14:
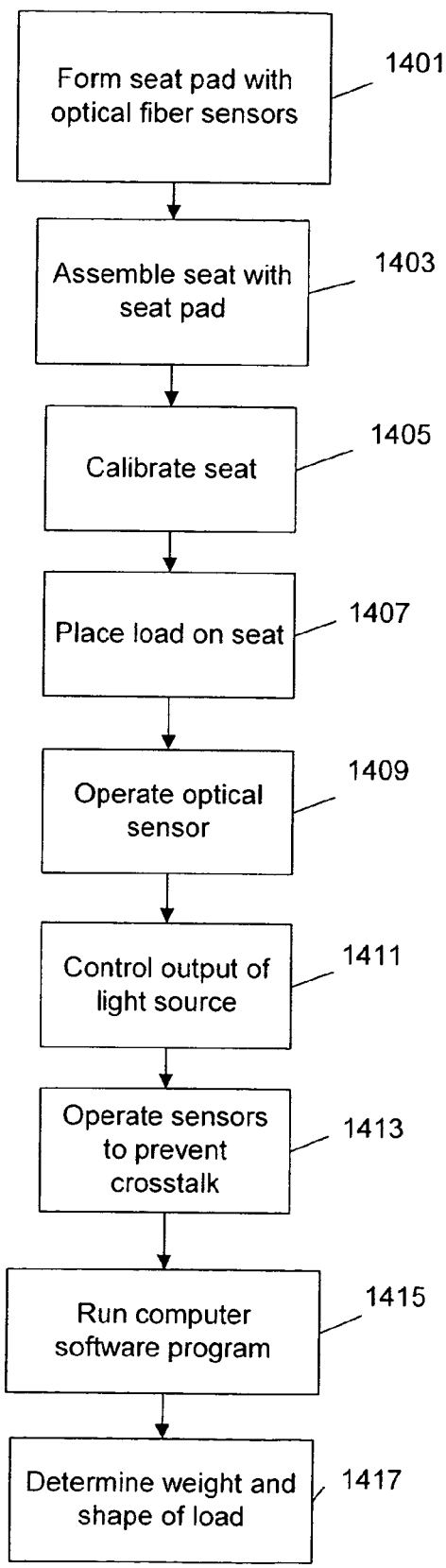
FIGS. 14–16 are flow charts for methods of classifying a load on a seat.

There are many ways to practice the present invention. FIG. 14 depicts a flowchart for a method of operating a motor vehicle and classifying a load on a seat. A first step in the method is to form 1401 a seat pad with optical fiber sensors as described earlier, as part of an optical fiber system. The seat pad with an array of optical sensors is then assembled 1403 into a seat for an automobile or a truck. The seat and the optical fiber system are then calibrated 1405. This may be accomplished with known loads in the seat, including no load in the seat, so that sensor calibration information can be recorded and programmed into the seat sensor's EEPROM (or microprocessor controller) as described earlier. This initial calibration need not be repeated, except at very infrequent intervals. A load to be classified is then placed 1407 onto the seat. The optical sensors are then operated 1409 by the optical fiber system. The system controls 1411 the output of one or more light sources for the system, such as by controlling the timing or the current of an LED driver in response to a closed-loop feedback system. This feedback may be one or more control optical sensors as described earlier.

The method also includes a step of operating 1413 the array of sensors in a manner to prevent crosstalk. One method to prevent crosstalk is to pulse every other sensor in an alternating manner, such as all odd-numbered sensors and then all even-numbered sensors. This method will prevent "cross-talk" or "light-leakage" from one fiber to the pixels of another fiber. A computer software program then operates 1415 the optical fiber system. The computer software program may include code segments embodied on a computer readable medium for performing the steps depicted in FIG. 15. Each step may include sub-steps or logic for performing the given steps. The optical fiber system and the computer program may then be used to determine 1417 a weight and shape of the load placed on the seat.

Figure 15:
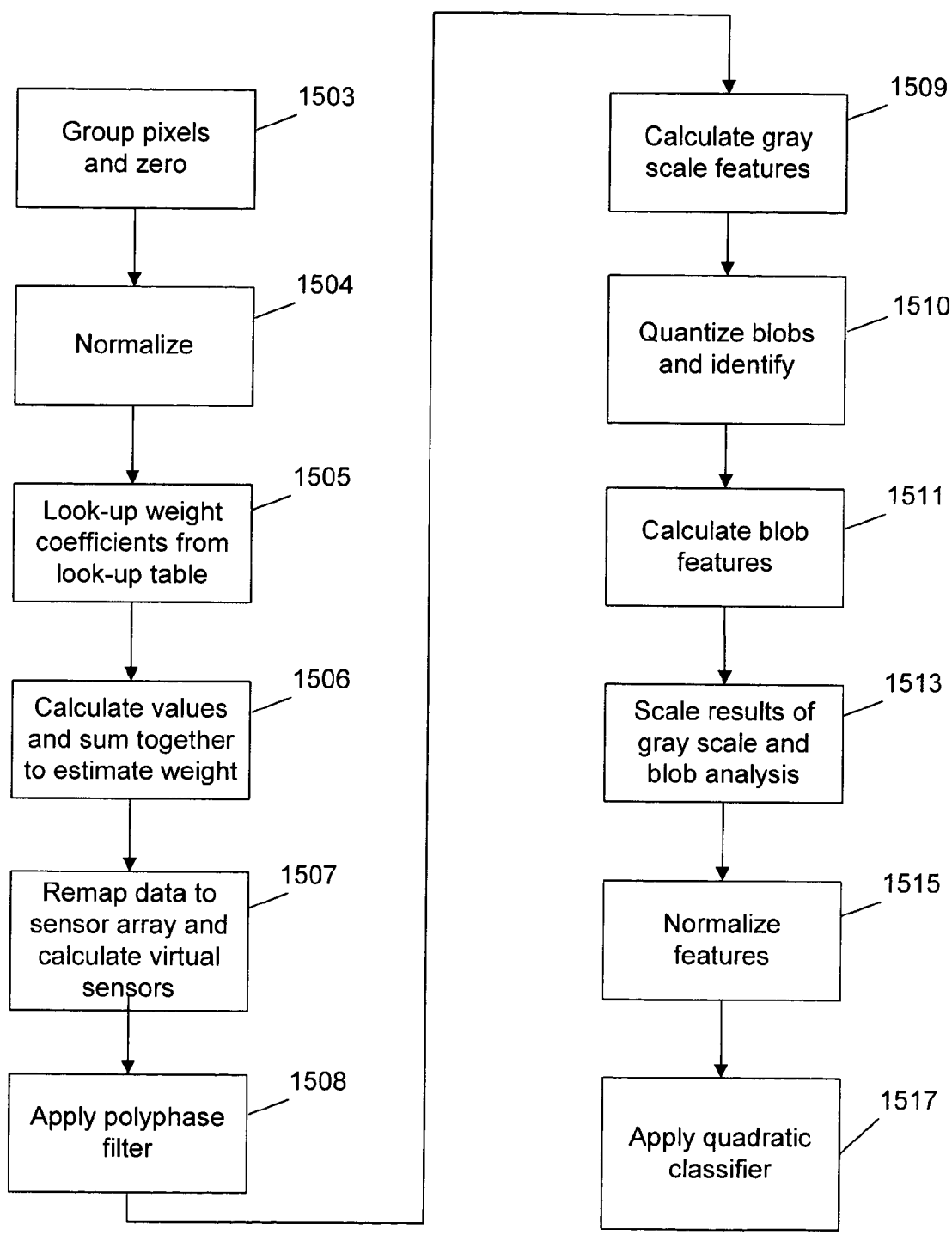
Figure 16:
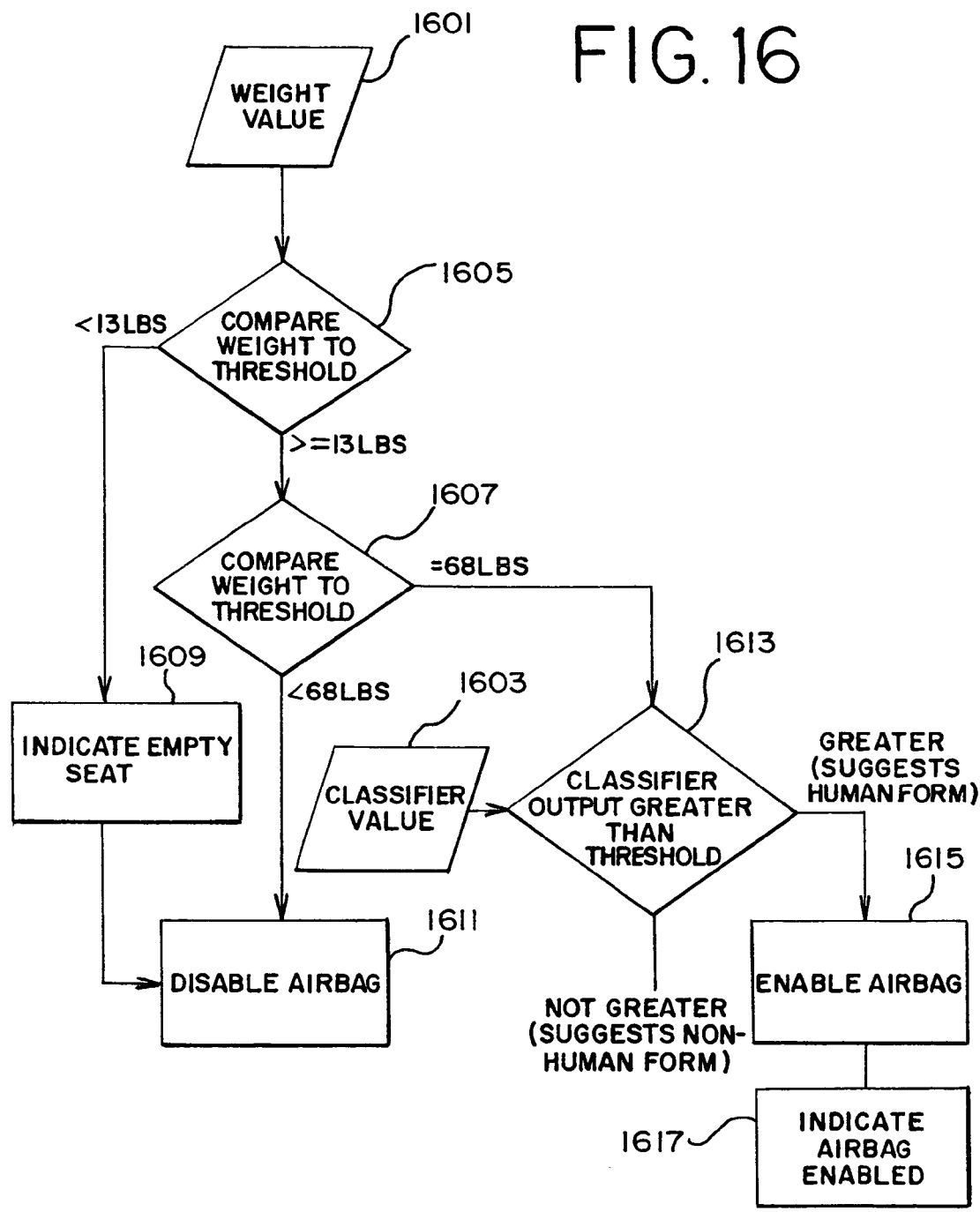

Using the techniques and embodiments described above and also shown in FIGS. 15 and 16, it is possible to determine a mass or weight of a load on a seat, and to estimate the nature, human or non-human, of the load or object on the seat. With this information, it is then possible to program the microprocessor controller to enable or to not enable one or more airbags meant for deployment to protect a person in the seat covered by a given sensor array. The decision, as shown in FIG. 16, may be based on the mass or weight of the load on the seat, and may be decided based on the estimated nature of the load. These techniques and embodiments may be used to assist in compliance with Federal Motor Vehicle Safety Standards (FMVSS), such as FMVSS 571.208, occupant crash protection.

One aspect of the invention is a process for classifying a load or an object on a seat. The process, as shown in FIG. 15, may use the seat described above to classify a seat occupant, and may use machine vision techniques, as well as other techniques, to evaluate data from the optical sensors in calculating a weight or mass and measuring the shape of the object. After the information from the light sensors is digitized by optical sensors and associated analog to digital converters (ADCs), such as linear array sensors and one or more ADCs on the microprocessor, the pixels are grouped and zeroed 1503, preferably in groups of four for each optical sensor, and the data is averaged to arrive at a value for each sensor. More pixels may also be used. The data are checked and no negative values are allowed for a "weight" or loading on each sensor. "Negative" values can occur with stretching or relaxing effects of seats, seat foam cushions, or trim covers. Any values that are negative are converted to no-load values. The data then undergo a linear transformation, or normalization 1504, such that each individual sensor no-load value is mapped to zero. Each individual sensor maximum value, determined in a calibration operation, is mapped to a predetermined maximum value. In one embodiment, the maximum is 1023, the interim sensor values are linearly interpolated between 0 and 1023, and thus each sensor has the same range and gain. Normalization may be an iterative process. Weight coefficients, possibly different for each sensor, are stored in a look-up table, accessed 1505 during the normalization process, and applied to the sensors, converting each value to a weight or mass. These values are then summed 1506 to arrive at a total weight or mass. This mass is then used in later decisions for the seat occupant classifier.

The data from the optical sensors is then mapped to an image data array within the software with each sensor's array position corresponding to its location in the seat. Remaining image data array positions are designated virtual sensors. In one way of using the invention, the value for each virtual sensor is calculated 1507 as an average of the value of its nearest neighbors. In areas where there are only a few or two neighbors for a sensor or a virtual sensor, the average value of the nearest few or two neighbors is determined and applied to the sensor in question, such as a remote virtual sensor. A polyphase filter 1508 is then applied to increase resolution of the sensor data and to increase compatibility with the particular machine-vision software used.

A polyphase filter is software code, an algorithm, executing several otherwise discrete functions in a single step. In one embodiment, a polyphase filter is applied to increase the resolution of the image data array. The process first involves initialization, setting multiple data locations in a new, expanded image data array to each of the values in a first, lower resolution image data array, and then manipulating the values to smooth the data. Smoothing the data means reducing the differences between adjacent data entries in the new, expanded image data array. The smoothing process may be accomplished by multiple passes of a low pass filter operating on the new, expanded array. In one embodiment, the polyphase filter executes the new, expanded image data array initialization as well as multiple iterations of a low pass filter for data smoothing. The total execution time for applying this polyphase filter is considerably less than doing each step sequentially. Other polyphase filters, or multi-step functions, may also be used.

Using known machine vision techniques, measurements or features are calculated 1509 using values from the entire image data array and stored for later computations. These are gray scale features. The data in the image data array are then binarized to zero or one. Zero corresponds to an image data array entry below a calculated threshold and one corresponds to an entry equal to or above the calculated threshold. Connected portions of the resultant binary image data array whose value equals one are numerically labeled and form 1510 one, or possibly more, representative shapes or blobs. Measurements or features of the blob are then calculated 1511. Grey scale and blob features are first scaled 1513 for range variations and then the features are normalized 1515.

A quadratic classifier is then applied 1517 to calculate the degree of similarity of the load to a known or programmed load. This degree of fit, the estimated nature of the load or object in the seat, may be used to classify the load. A classifier is a mathematical algorithm that uses a series of values, such as those derived from the sensor readings, to deduce a result. Certain classifiers, such as quadratic classifiers from C-Core, St. John's, Newfoundland, Canada, are useful in processing the signals derived from the sensors and arriving at an estimated shape of an object placed on the seat. Such classifiers may be used in conjunction with sensor performance parameters (as described above in the section on sensor performance) and known loads to train seat occupancy classification systems. Known loads are compared with classifier results and the classifier and sensor parameters may be adjusted until the desired degree of accuracy in shape and mass determination is achieved.

In one embodiment of the invention, a decision may be based on either the mass or the estimated nature of the object. FIG. 16 depicts a method for classifying an object in a seat. The method begins with a routine for checking a weight value 1601 and for a threshold output value 1603 from the classifier. The weight or mass is initially checked 1605 and compared to a minimum weight or mass, such as 13 pounds. If the weight is less than the threshold, such as 13 pounds, the classifier may indicate that the seat is empty 1609 (for instance, with a red LED or other display) and the airbag may be disabled 1611. If the mass is greater than the threshold, there may be a second decision 1607 to see whether the mass is above or below another limit, such as 68 pounds. If the mass is less than 68 pounds, such as for a child, the airbag may again be disabled 1611. If the mass is greater than 68 pounds, the pattern from the object is also checked 1603 to see whether the output from the classifier is above a threshold limit 1613. A decision is made as to whether the object is non-human or human, based on the analysis previously described. If the object is non-human, there may be no need to deploy an airbag, and the airbag may be disabled 1611. If the pattern is classified as characteristic of a "human" shape, then the method may enable the airbag 1615. The system may also indicate that the airbag is enabled 1617 with an LED, such as a green LED, or other display. Other decisions or other weight limits may be used. If the system estimates the nature of the load as being a rear-facing child protective seat, the airbag may be disabled. If the system estimates the nature of the load as a booster seat shape (i.e., nonhuman) used for a child of sufficient weight, the output may be enabled. The system may be programmed as desired, inserting appropriate limits for weight and nature of the load on the seat.

It is intended that the foregoing detailed description be regarded as illustrative rather than limiting. While this invention has been shown and described in connection with the preferred embodiments, it is apparent that certain changes and modifications, in addition to those mentioned above, may be made from the basic features of this invention. For example, while embodiments using 64 optical fiber sensors have been depicted, other quantities of sensors may also be used. While the sensors have been arranged largely in a square or rectangular pattern, other arrangements, such as concentric circles, ellipses, or irregular patterns may be used. While an array of 17 virtual sensors has been used, more or fewer virtual sensors may be used. Individual or bucket seats have been .illustrated, but the techniques and embodiments of the invention may be applied to bench seats, for more than one person. For instance, the seat may be divided into seating areas for more than one person, and a sensor array may be allocated to each of the one or more seating areas, the arrays connected to one or more controllers as described above. While optical fiber sensors useful for visible light have been described, other embodiments using infrared or other wavelengths of radiation may be used, and waveguides may be used in place of standard optical fibers. Accordingly, it is the intention of the applicants to protect all variations and modifications within the valid scope of the present invention. It is intended that the scope and spirit of the invention be defined by the following claims, including all equivalents.

What is claimed is:

1. A sensing system for sensing a load, comprising:
a sensing pad, the sensing pad further comprising a laminate structure and an array of optical sensors, each optical sensor comprising a discrete pair of optical fibers fused side by side at one end, and wherein sensor response depends on the load in the vicinity of each sensor.

2. The sensing system of claim 1, wherein the laminate structure comprises two layers of silicone foam with an adhesive inbetween.

3. The sensing system of claim 1, further comprising a strain relief within the sensing pad for at least one of the optical sensors.

4. The sensing system of claim 1, further comprising a strain relief between the array of optical sensors and a termination of optical fibers comprising the optical sensors.

5. The sensing system of claim 1, further comprising a light source and a light detector for transmitting light to the array and receiving light from the array.

6. The sensing system of claim 1, wherein the sensing pad comprises cutouts for a trench.

7. The sensing system of claim 1, further comprising a control sensor for adjusting the array of optical sensors.

8. The sensing system of claim 7, further comprising a second foam laminate structure for the control sensor.

9. The sensing system of claim 7, wherein the control sensor is an optical sensor.

10. The sensing system of claim 1, wherein the sensing pad comprises a laminated foam structure with an array of optical sensors between laminates of foam, each sensor comprising a pair of optical fibers joined at one end, and each sensor adhered to an inside surface of a foam laminate.

11. The sensing system of claim 1, further comprising a microprocessor controller, at least one light source, and at least one light detector, for controlling the array of sensors.

12. The sensing system of claim 11, wherein the light detector is a linear array sensor.

13. The sensing system of claim 1, wherein the army is in the shape of a square matrix, the sensors generally located at intersections of a series of vertical and horizontal lines, and wherein the sensors are not located within trenches.

14. The sensing system of claim 1, further comprising a cover for the pad.

15. The sensing system of claim 14, wherein the cover comprises a liquid barrier.

16. A combination of the sensing system of claim 1, a seat and a trim cover.

17. A sensing system for sensing a load, comprising:
a sensing pad, the sensing pad further comprising a laminate structure comprising two layers of silicone foam and an adhesive inbetween and an array of optical sensors, each optical sensor comprising a discrete pair of optical fibers, wherein at least one sensor includes a strain relief.

18. The sensing system of claim 17, wherein the optical sensors comprise waveguides.

19. The sensing system of claim 17, wherein the sensing pad comprises two layers of silicone foam with an adhesive inbetween.

20. The sensing system of claim 17, further comprising a control sensor for adjusting the array of optical sensors.

21. The sensing system of claim 17, further comprising a cover for the pad.

22. A combination of the sensing system of claim 17, a seat, and a trim cover.

23. A sensing system for sensing a load, comprising:
an array of optical sensors in a sensing pad, each optical sensor comprising a pair of optical fibers joined side by side at an end, and wherein sensor response depends on the load in the vicinity of each sensor;
an optical control sensor for adjusting the array of optical sensors; and
a liquid barrier material covering the pad.

24. The sensing system of claim 23, wherein the sensing pad comprises a foam layer and a second layer, and an adhesive inbetween, the array of sensors adhered to the adhesive.

25. The sensing system of claim 23, wherein each sensor is arranged in the sensing pad with a strain relief.

26. The sensing system of claim 23, further comprising a control sensor for controlling the array of optical sensors.

27. The sensing system of claim 23, further comprising a cover for the pad.

28. A combination of the sensing system of claim 23, a seat, and a trim cover.

29. A method of manufacturing a system for sensing a load, the method comprising:
placing a plurality of optical sensors onto an adhesive surface;
assembling ends of the optical sensors into terminations;
trimming two optical fibers at a time, wherein the step of trimming coins ends of the fibers to form an optical sensor;
adhering a foam layer to the adhesive surface; and
adhering a second layer over the sensors to form a sensing pad.

30. The method of claim 29, wherein the step of placing the optical sensors includes placing a strain relief for at least one optical sensor.

31. The method of claim 29, wherein the optical fibers are plastic and the step of trimming is performed with a laser.

32. The method of claim 29, further comprising assembling a strain relief for the sensing pad.

33. The method of claim 29, further comprising covering the sensing pad with an opaque liquid barrier.

34. The method of claim 29, further comprising forming a control sensor for the system.

35. The method of claim 29, wherein the second layer is a foam layer.

36. The method of claim 29, further comprising assembling the system into a seat.

37. A system for sensing a load, comprising
a sensing pad comprising two layers of silicone foam joined by an adhesive, and an array of optical sensors adhered to the adhesive; and
a first interface gathering an end of a first fiber from each sensor and a second interface gathering an end of a second fiber from each sensor.

38. The system of claim 37, wherein each optical sensor comprises a pair of optical fibers joined side by side at an end of each fiber.

39. The system of claim 37, wherein the first interface is an optical interface to a light source and the second interface is an optical linear array sensor.

40. The system of claim 37, further comprising an opaque liquid barrier covering the sensing pad.

41. The system of claim 37, further comprising at least one of a strain relief between the first interface and the sensors, a strain relief between the second interface and the sensors, and a strain relief for at least one of the sensors.

42. The system of claim 37, further comprising a control sensor connected to the first interface and the second interface.

43. The system of claim 37, further comprising a microprocessor controller in controllable communication with the sensors and at least one of a DSP and an EEPROM in communication with the microprocessor.

44. A combination of the sensing system of claim 37, a seat, and a trim cover.

45. A system for sensing a load on a seat, the system comprising:
a seat;
a sensing pad atop the seat, the sensing pad further comprising an array of optical sensors made from optical fibers between layers of reflective material and further comprising preformed cutouts for a trench;
a trim cover;
a first interface gathering an end of one of said fibers from each sensor and a second interface gathering an end of another of said fibers from each sensor;
a microprocessor controller for sensing outputs of the sensor; and
software embodied on a computer-readable medium and accessible to the microprocessor controller for computing at least one of a mass and a shape of a load on the seat.

46. The system of claim 45, wherein the computer and the software compute using at least one technique selected from the group consisting of machine vision, blob analysis, feature shape, feature moment, neural networks, object segmentation, object recognition, fuzzy logic, decision tree, K-nearest neighbor, quadratic classification, a polyphase filter, and linear classification.

47. The system of claim 45, wherein each optical sensor comprises at least one pixel and further comprising a plurality of virtual sensors.

48. The system of claim 47, wherein at least a portion of the virtual sensors are located in a trench of the seat.

49. The system of claim 47, wherein at least two nearest sensors are weighted from about 40/60 to about 60/40 in computing at least one of the mass and the shape of the load.

50. The system of claim 45, wherein the system further comprises a built-in-test routine.

51. The system of claim 45, wherein the sensing pad comprises two layers of silicone foam joined by an adhesive, the array of optical sensors adhered to the adhesive, and wherein each optical sensor comprises a pair of optical fibers joined side by side at one end of each fiber.

52. The system of claim 45, wherein the system includes at least two light sources and two light detectors operably connected to the sensors.

53. The system of claim 52, wherein the software includes a routine for driving the at least two light sources at different times.

54. The system of claim 47, wherein at least one of the virtual sensors is weighted in calculations used to compute at least one of the mass and the shape of the load.

55. A method for sensing a load on a seat, the method comprising:
forming a seat, the seat comprising a sensing pad having an array of optical sensors within the pad, each optical sensor comprising a discrete pair of optical fibers fused side by side on one end;
placing a load on the seat; and
operating the optical sensors and a machine vision computer program to determine at least one of a mass and a shape of the load.

56. The method of claim 55, wherein the method comprises controlling an output of optical light sources for the optical sensors with a control sensor.

57. The method of claim 55, wherein the optical sensors are pulsed alternately.

58. The method of claim 55, wherein the method comprises a step of normalizing the optical sensors between zero and a maximum load.

59. The method of claim 55, wherein the method comprises a step of mapping data onto a grid of sensors to determine a mass of the load.

60. The method of claim 55, wherein the method comprises a step of mapping data onto a grid of real sensors and virtual sensors to determine a shape of the load.

61. The method of claim 55, wherein the method comprises a step of applying a polyphase filter to data calculated in the program.

62. The method of claim 55, wherein the method comprises a step of comparing a shape of the load to at least one of a plurality of shapes in a library of shapes and deciding whether the shape of the load matches at least one of the plurality of shapes.

63. A method for classifying an occupant of a seat, the method comprising:
occupying the seat;
operating a sensing pad with an array of optical sensors within the seat, each sensor comprising a pair of optical fibers joined at ends of the optical fibers;
adjusting the array of optical sensors using a control optical sensor;
storing data from said optical sensors in a memory accessible to a computer;
calculating at least one of a mass and a shape of the occupant;
deciding whether the occupant is a human or a non-human; and sending a signal.

64. The method of claim 63, wherein the method comprises controlling an output of optical light sources for the optical sensors with a control sensor.

65. The method of claim 63, wherein the optical sensors are pulsed alternately.

66. The method of claim 63, wherein the method comprises a step of normalizing the optical sensors between zero and a maximum load.

* * * * *

UNITED STATES PATENT AND TRADEMARK OFFICE
CERTIFICATE OF CORRECTION

| | | |
|---|---|---|
| PATENT NO. | : 7,043,997 B2 | Page 1 of 1 |
| APPLICATION NO. | : 10/616020 | |
| DATED | : May 16, 2006 | |
| INVENTOR(S) | : Daniel J. Mattson et al. | |

It is certified that error appears in the above-identified patent and that said Letters Patent is hereby corrected as shown below:

Column 18, in claim 29, line 7, after "trimming" delete "coins" and substitute --joins-- in its place.

Signed and Sealed this

Seventeenth Day of April, 2007

JON W. DUDAS
*Director of the United States Patent and Trademark Office*